June 10, 1930.  G. F. DALY ET AL  1,762,145
TABULATING MACHINE
Filed Feb. 5, 1925   9 Sheets-Sheet 1
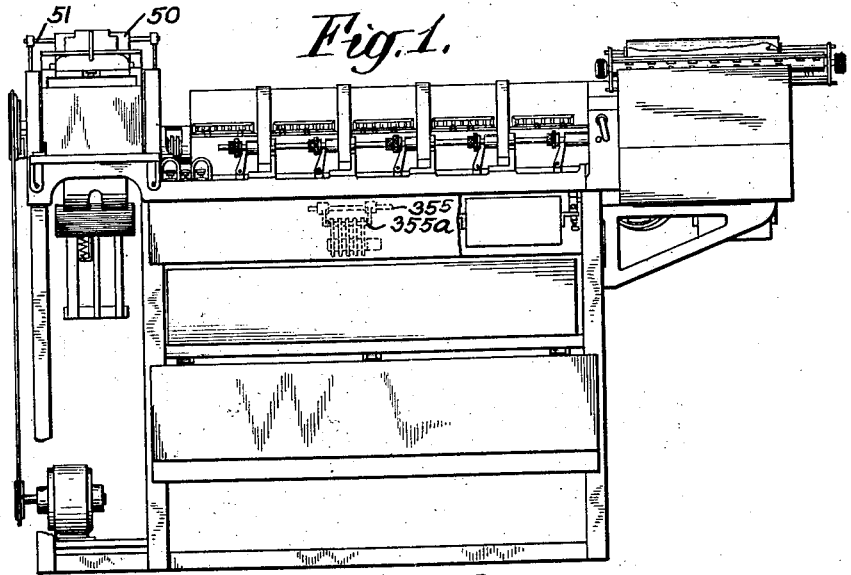
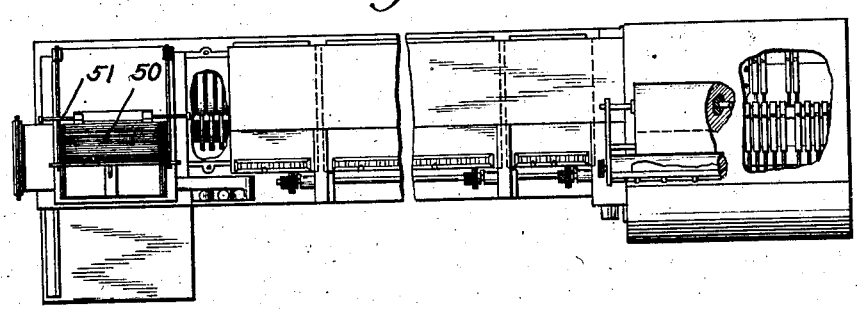
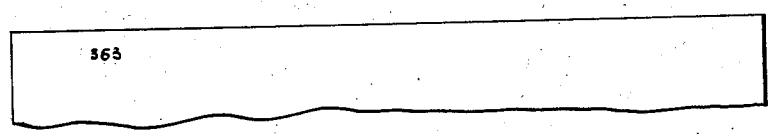
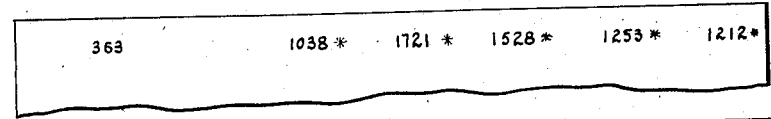
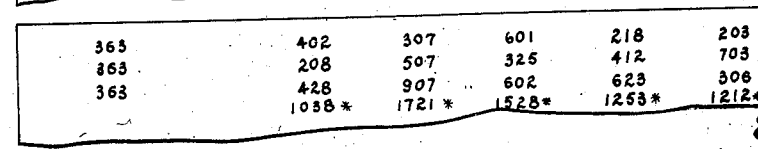
Inventors
George F. Daly
and
Ralph E. Page
By their Attorneys
Cooper, Kerr & Dunham June 10, 1930.    G. F. DALY ET AL    1,762,145
TABULATING MACHINE
Filed Feb. 5, 1925    9 Sheets-Sheet 2

Inventors
George F. Daly
and
Ralph E. Page
By their Attorneys
Cooper, Kerr & Dunham June 10, 1930.  G. F. DALY ET AL  1,762,145
TABULATING MACHINE
Filed Feb. 5, 1925   9 Sheets-Sheet 3

Inventors
George F Daly
and
Ralph E Page
By their Attorneys
Cooper, Kerr & Dunham

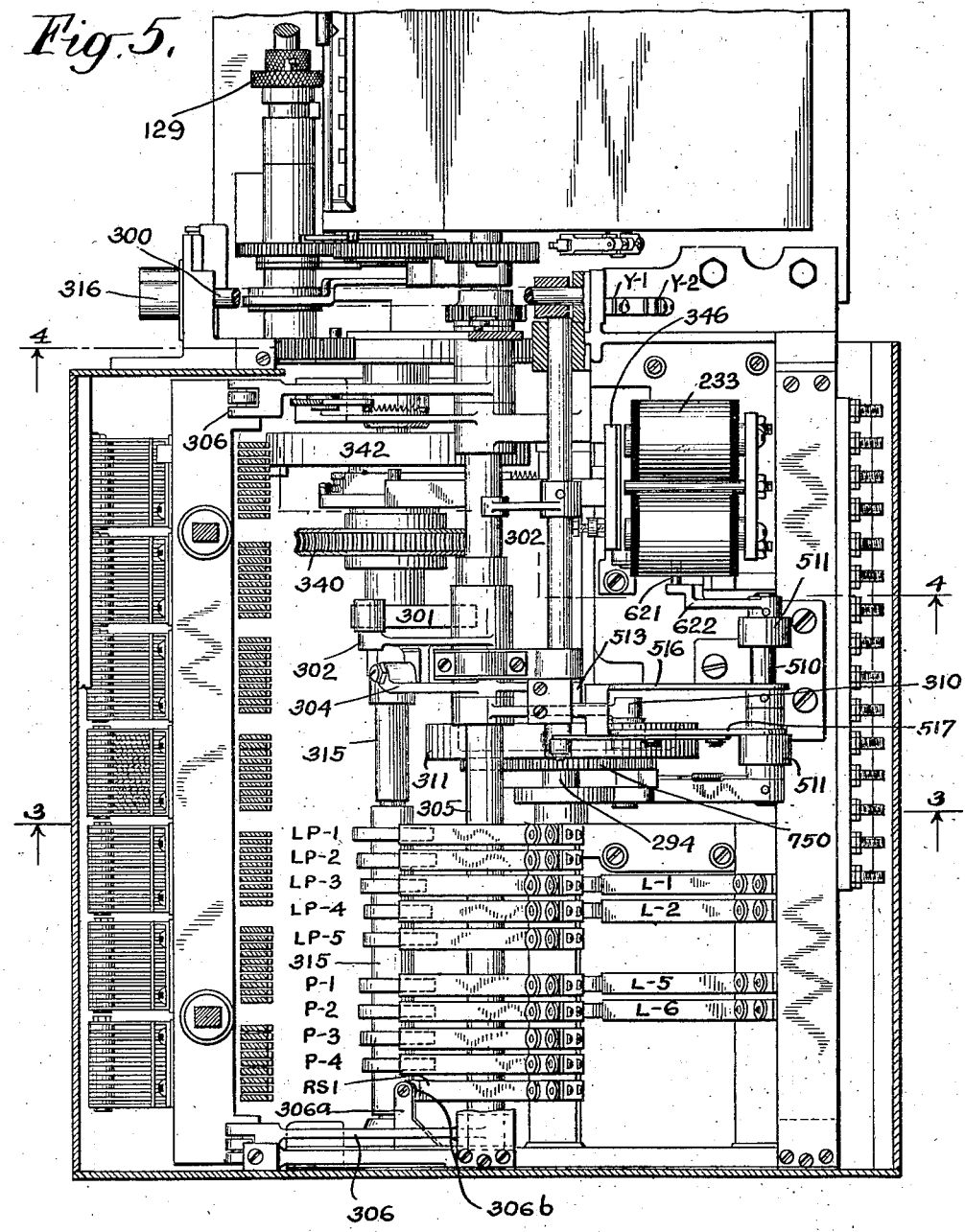

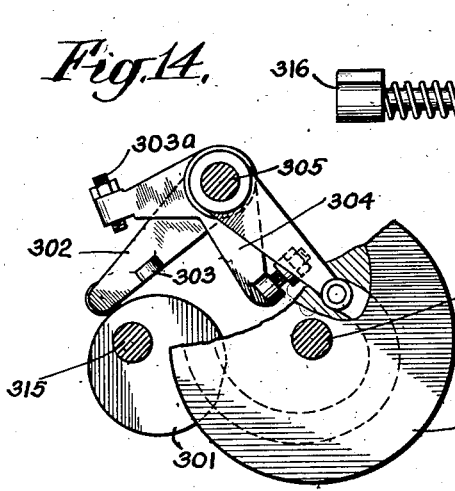
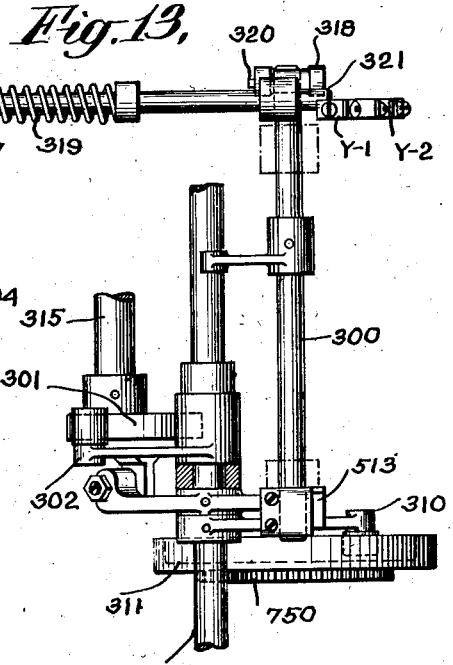
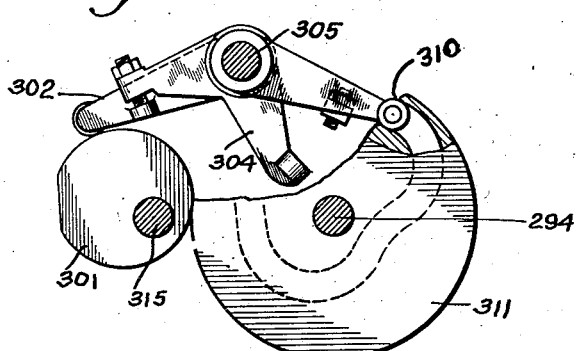
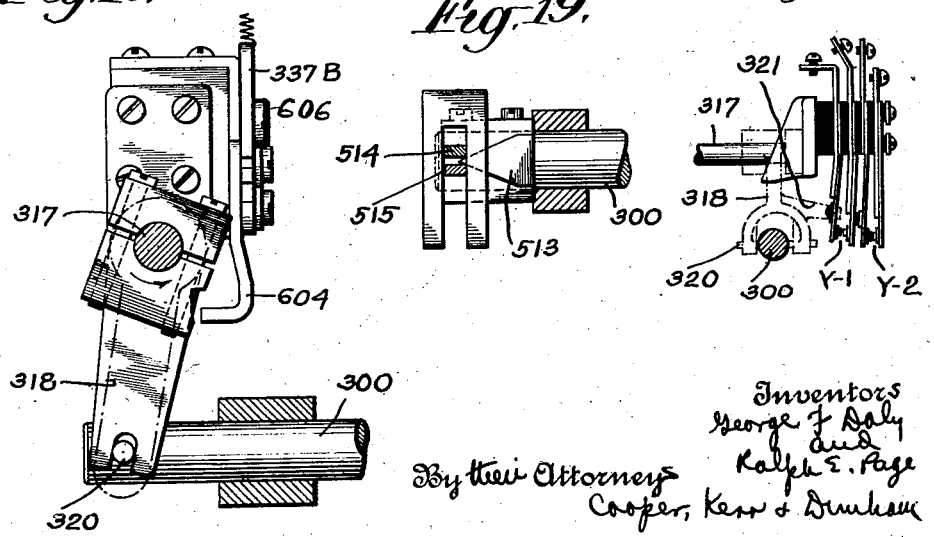
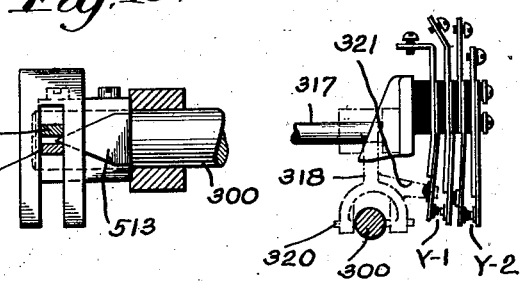

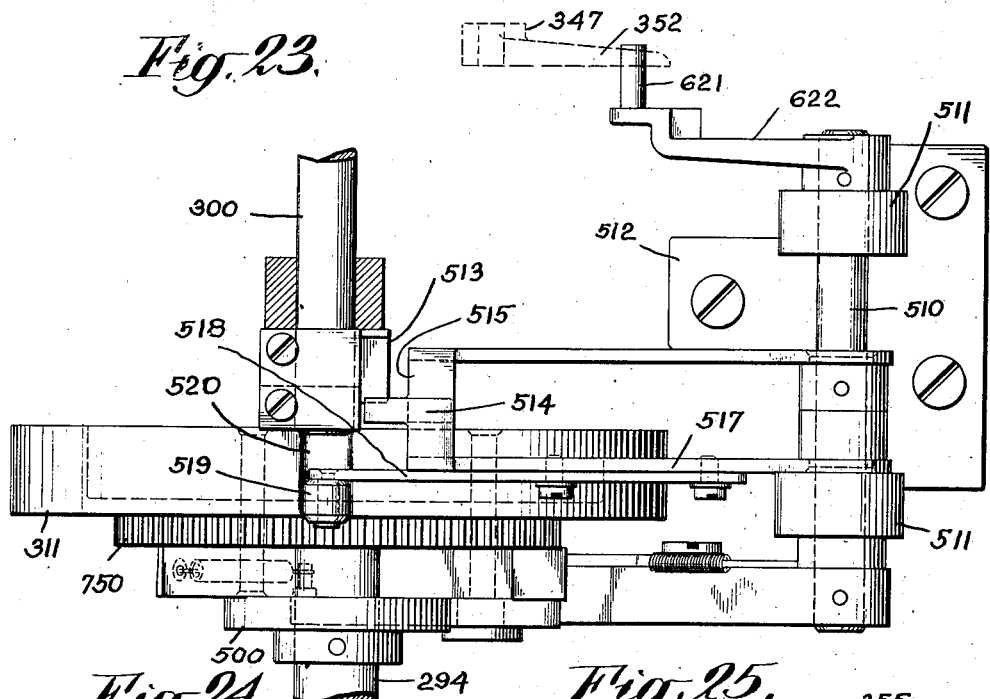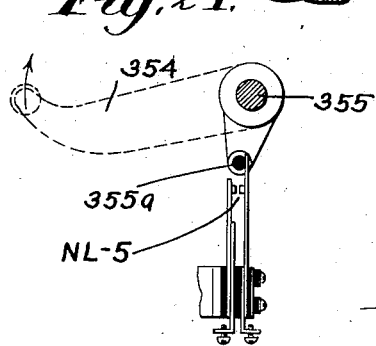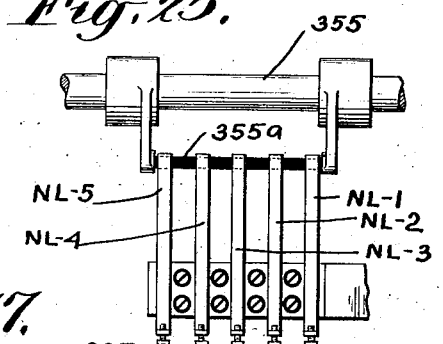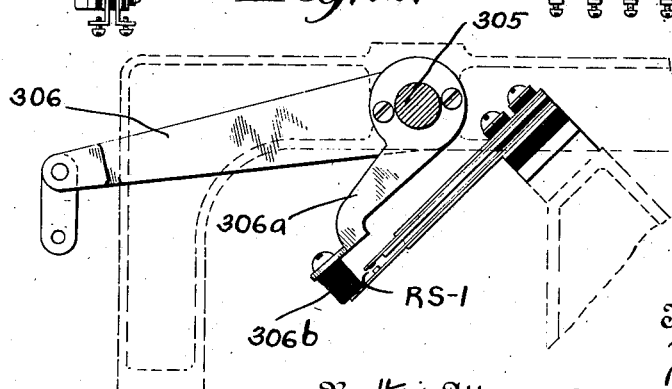

June 10, 1930.    G. F. DALY ET AL    1,762,145
TABULATING MACHINE
Filed Feb. 5, 1925    9 Sheets-Sheet 7

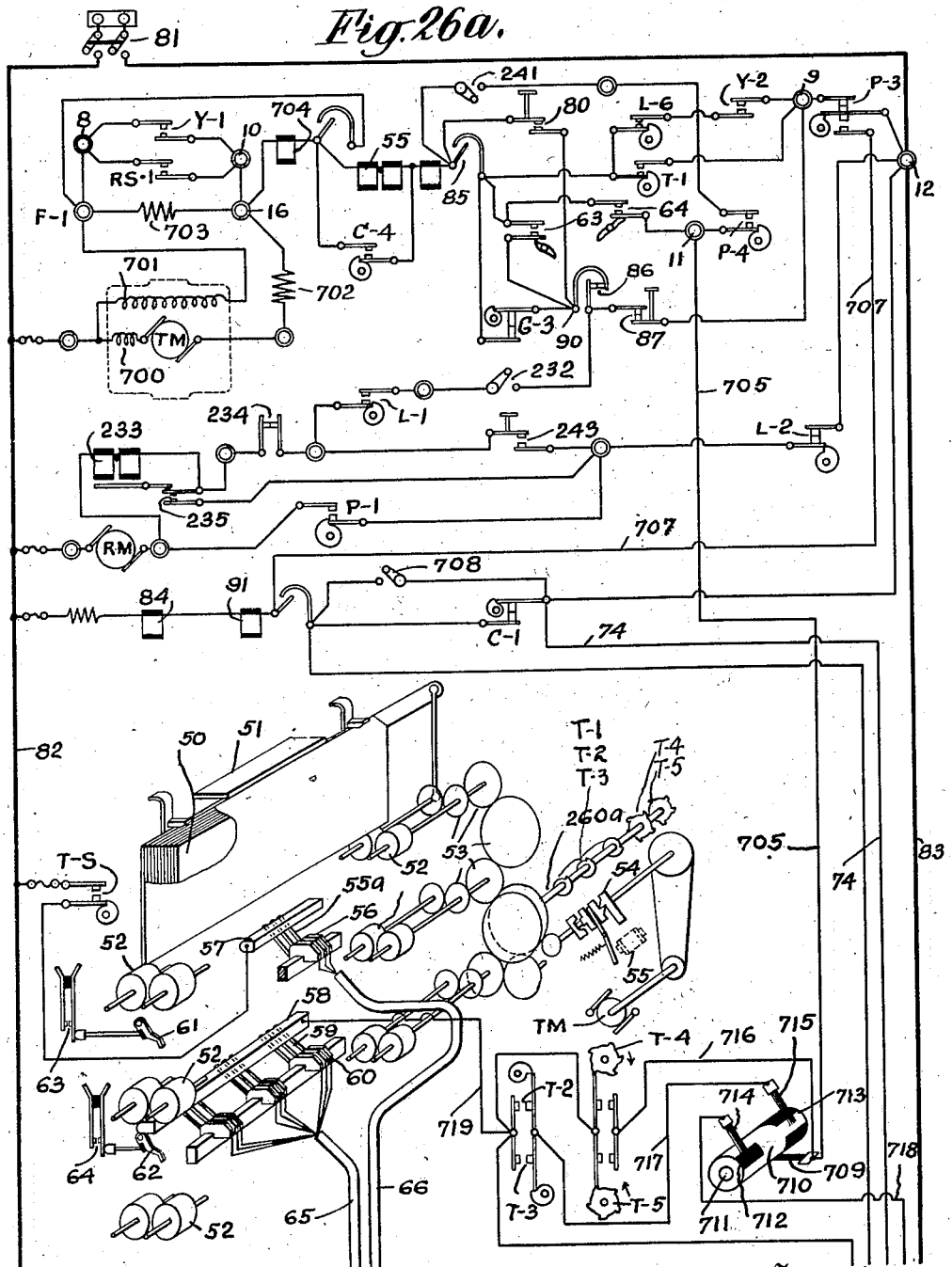

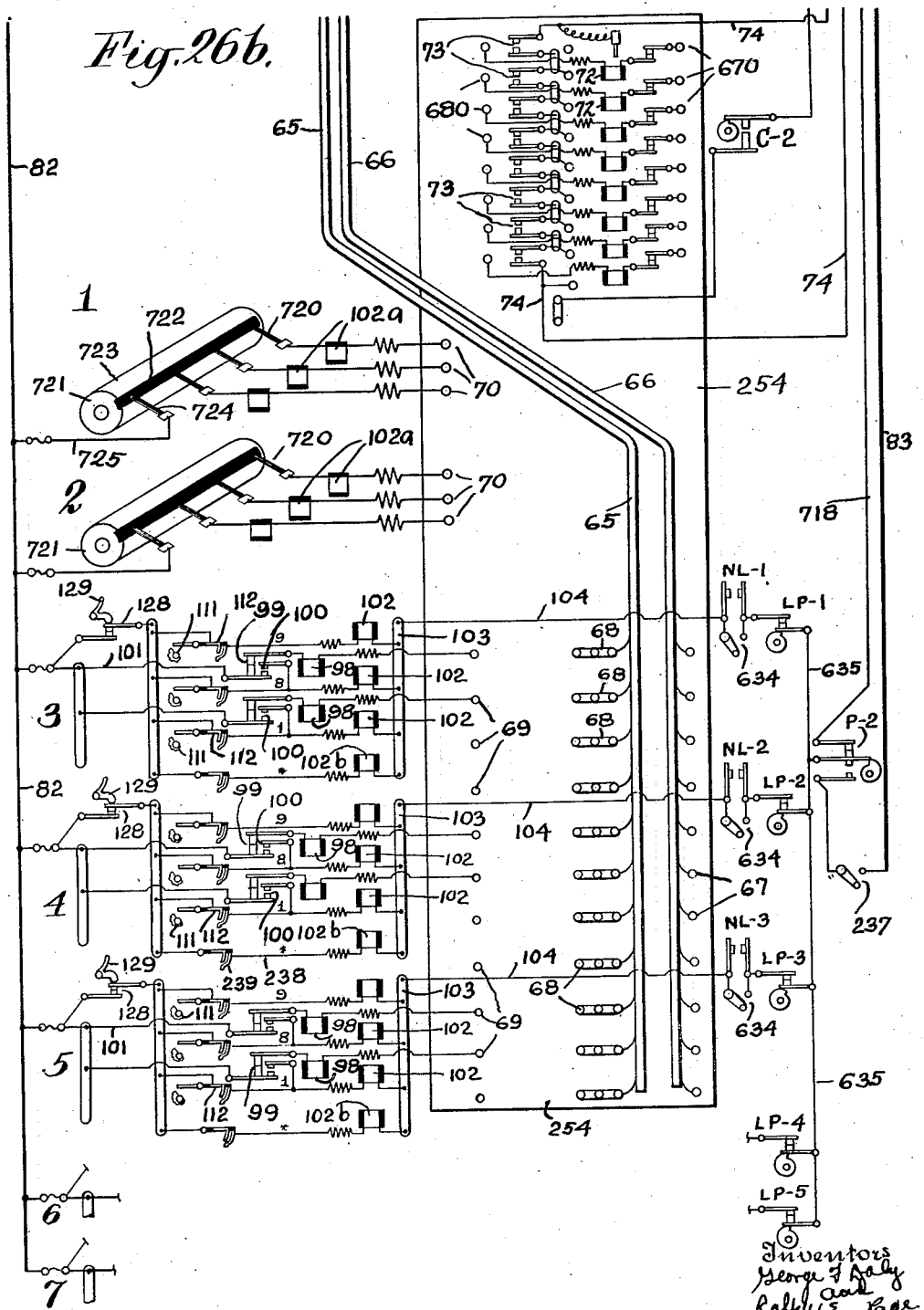

Patented June 10, 1930

1,762,145

UNITED STATES PATENT OFFICE

GEORGE F. DALY AND RALPH E. PAGE, OF BINGHAMTON, NEW YORK, ASSIGNORS TO THE TABULATING MACHINE COMPANY, OF ENDICOTT, NEW YORK, A CORPORATION OF NEW JERSEY

TABULATING MACHINE

Application filed February 5, 1925. Serial No. 6,980.

The present invention is directed to improvements in tabulating machines and more particularly to improvements in the tabulating machine shown and described in the copending application of Clair D. Lake, Serial No. 639,153, filed May 15, 1923, and the application of Clair D. Lake and Ralph E. Page, Serial No. 6,981, filed February 5, 1925.

The present invention has for one of its objects the simplification of the mechanism and wiring of former devices to the general end that expense in building and maintaining the machines may be decreased.

A further object of the present invention is the provision of a two speed motor for driving the machine, in which the motor speed and torque characteristics are such that while normal slow speed operation of the machine is secured for all printing work a much higher speed is obtained during non-print operations. This means that slow speed is used for all cards of a group when the machine is set for listing (printing all items), and for the first card of every group when the machine is set for tabulating only, i. e., printing only group numbers and totals but not the individual items. Furthermore the motor is so regulated and controlled by the tabulating machine control devices that its low and high speed characteristics render unnecessary the speed changing gear transmission heretofore employed in machines of this class, which materially simplifies the control of the machine.

A further object of the present invention is the elimination of the various group indicator contacts, group indicator control magnet and associated parts and wiring therefor heretofore employed, and in the provision of a simple single contact mechanism controlled by the printing section of the machine to control the motor and tabulating machine speeds which were heretofore controlled by a plurality of comparatively complicated devices and contacts.

A further object of the present invention is the provision of a simple circuit controller preferably of the commutator type for controlling the supply of current to the printing magnets under various operating conditions of the machine. The operation of the commutator is wholly automatic being directly controlled by printing mechanism parts and obviates manual control of printer circuits as heretofore employed.

A further object of the present invention resides in the combination with tabulator devices of a two speed driving motor therefor coordinated with and controlled by the tabulating machine so as to drive the same at various speeds, and providing maximum torque when the tabulating machine requires a large driving torque such as for instance during listing operations.

Incidental to the foregoing, means is provided for securing a high starting torque in the motor when the same starts, this high starting torque being provided automatically and without any attention or manipulation by the operator.

Other objects reside in the general simplification of the machine as a whole, the simplification of elimination of manual control devices heretofore employed, and in changes in the wiring of the machine to the general end that less skill is required of the operator of the machine.

Other objects and advantages will be pointed out in the accompanying specification and claims and shown in the accompanying drawings which show one, and what is now considered to be preferred, embodiment of the invention.

In the statistical work handled by tabulating machines the record cards are usually arranged in groups, each card of the group bearing a distinguishing number which serves to identify that particular group, and it is customary for the machine to indicate the group number of each group for purposes of identification.

In the machine described in the previous Lake application, Serial No. 639,153, this group indicating was effected by the regular tabulating counters or accumulators, the group number being entered into a counter from the first card of each group. Thereafter the entering of further group numbers into the counter was suppressed by means of group indicator contacts which opened up after the passage of the first card.

In the present machine the use of group indicator contacts is obviated. In place of entering group numbers upon a counter or counters the group number as taken from the card is arranged to directly control the printing mechanism of the machine. The feature of suppressing the entering of items into the accumulator after the passage of the first card is obviated. Group numbers may or may not be entered into the accumulator, but, if entered, these group numbers will be accumulated therein, there being no suppression of the accumulation of group numbers.

When this machine is used as a straight tabulator, without listing the items, it is run at a comparatively high speed but while the first card of each group is passing, and the group number is being printed therefrom, provision is made for running the printing attachment at the usual (slow) printing or listing speed, otherwise the mechanism would be damaged. After the first card has passed and the group number has been printed the machine automatically resumes its higher speed for tabulating the remaining cards of that group.

In connection with the printing of the group number in straight tabulating (non-listing) operations provision is made for printing the group number upon the record sheet only upon the passage of the first card of a group. Then the normal paper feed is suppressed and when ultimately the total of that group is printed it is printed in alignment with the previously printed group number. Thereafter the normal paper feed is resumed to space the paper to position to receive the new group number imprint of the next group.

When the machine is set for listing, the group number is printed concurrently with each listed item of that group. The group number is not repeated when printing totals of listed items. The printing of all totals is effected at proper printing speed by the reset motor.

In the drawings,

Fig. 1 is a front view of a tabulator embodying the improvements of the present application.

Fig. 2 is a top plan view of the same on a slightly larger scale.

Fig. 5 is a top plan view, partly in section of the parts in the base of the printer section, the magnets being removed and the section being taken substantially on line 5—5 of Fig. 3.

Figs. 10, 11 and 12 show samples of the work performed on the machine.

Fig. 13 shows the list-non-list shifting lever and its controlling connections to the listing cam.

Figs. 14 and 15 show different positions of the levers with which the listing and printing cams cooperate.

Fig. 16 is a detail sectional view taken on line 16—16 of Fig. 13 and showing the devices operated by the listing lever shaft for shifting the clutch control rod.

Fig. 17 shows the devices for operating the contacts which are under the control of the type carriers.

Fig. 18 shows the listing contacts in the position which they assume when the machine is set for listing.

Fig. 19 is a sectional view taken substantially on lines 19—19 of Fig. 7 showing the parts enlarged and with the clutch control shaft in tabulating position.

Fig. 23 is an enlarged top plan view of the listing cams shown in Fig 13 together with other parts shown in Fig. 5, on an enlarged scale.

Figs. 24 and 25 are side and elevational views respectively of the non-print contacts shown in dotted lines in Fig. 1.

Figure 3:
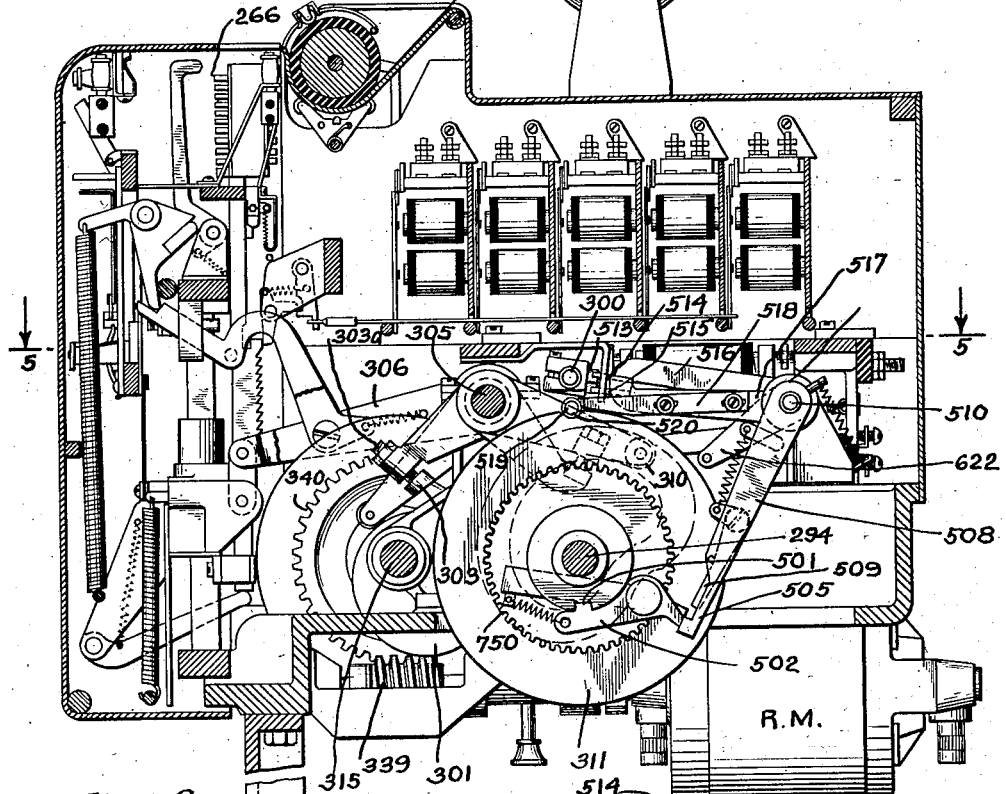
Fig. 3 is a sectional view of the printing section of the machine, the section being taken substantially on lines 3—3 of Fig. 5.

Figs. 26ª and 26ᵇ taken together show an electro-mechanical wiring diagram of the machine.

In describing the machine two conditions must be considered. The first or tabulating condition makes records of group numbers and totals only. The second or listing condition prints the individual items with the group numbers and then prints the totals of the items without the group numbers. If the machine is to be set for tabulating (totaling) items without listing the individual items, i. e., the first condition mentioned above, so that only totals and group number are printed upon the record sheet, provision is made for initially printing the group number upon the sheet, as shown in Fig. 10. Subsequently, when totals have been accumulated by the machine, these totals are entered upon the record sheet in alignment with the previously printed group number, as shown in Fig. 11 of the drawings.

The second or listing condition has a different operation. Here both group number and items are printed concurrently, the group number being repeated for each item as shown in Fig. 12. Finally totals are printed without the group number. The achievement of these results involves the operation of the listing cam and the parts controlled thereby, and also the operation of the paper feed.

A clear understanding of the present machine will best be had by describing the operation of the previous machines upon which the present invention is an improvement.

In previous machines, described in the co-pending Lake application above referred to, the rising of the type 266 (Fig. 3) when the machine was set for listing, was brought about by rocking shaft 305 through the instrumentality of listing cam 311. When totaling operations were to be effected, the type were raised by means of total cam 301.

In the Lake machine the listing cam 311 was driven at all times when the tabulating machine was operated. If it was desired not to list the individual items, but only to tabulate, i. e., print totals, provision was made for withdrawing the listing cam roller from cooperation with the listing cam.

Having now described briefly the previous construction, the modified construction of the present machine will be described.

Fixed to the listing cam shaft 294, adjacent the listing cam 311, is a clutch disk 500 (Figs. 3, 6 and 7) provided with a notch 501. Listing cam 311 is loose upon the listing cam shaft 294 and during listing operations this listing cam is clutched to shaft 294, by the means which are now to be described.

Pivotally mounted upon the listing cam 311 is a clutch member 502. The clutch dog 502 is normally drawn into engagement with disk 500 by means of a spring 503 which, at its opposite end, is fast to a part 504 extending over and terminating in a nose 505. The clutch dog 502 is provided with a tail or pawl portion 506, which is adapted to cooperate with a shoulder portion 507 upon a rocking lever 508. Lever 508 is also provided with a supplementary pivoted latch 509 which allows the member 504 to pass it and prevents backward rebound of the same. For normal listing operations, lever 508 is in the position shown in Fig. 6. With the parts in this position clutch dog 502 is in engagement with the notch 501 and this couples the listing cam 311 to the listing cam shaft 294. The lever 508 is fixedly mounted upon a stub shaft 510 (see Fig. 23), which shaft is journaled in lugs 511 fixed to a bracket 512 on the frame of the machine. It will be understood that shaft 510 must be rocked in a counterclockwise direction to allow the clutch dog 502 to engage for listing. This rocking is effected by the list-non-list shift lever of the tabulator.

Referring now to Fig. 13: 316 is the list-non-list lever of the tabulator. This lever is fast to a rod 317, and around this rod is the usual compression spring 319 heretofore employed to hold 316 in its set positions. As in the previous construction the shaft 317 is provided with a shifter fork 318 (Fig. 16) coacting with cross pins 320 on a shifter rod 300. The arrangement is such that by rocking lever 316 from the tabulating or non-listing position, as shown in Fig. 13, to listing position, i. e., in the direction indicated by the curved arrow (in Fig. 16), the shifter rod 300 will be shifted downwardly from the position shown in Fig. 13. In place of connecting the slip or shifter rod 300 to the follower 310, which cooperates with the listing cam 311 as in the previous construction, the follower 310 is arranged so as to be always in engagement with the cam slot in cam 311. It is entirely free of control by the shifter rod 300. Upon the end of the shifter rod 300 there is provided a beveled nose 513 (see Fig. 19), which nose, when 300 is shifted downwardly, separates two fingers 514 and 515. In Fig. 19 these parts are shown in non-separated position. Finger 515 (see Fig. 6) is fast upon a pivoted arm or lever 516, which in turn is fixed to the stub shaft 510 previously referred to (see Fig. 23).

Figure 6:
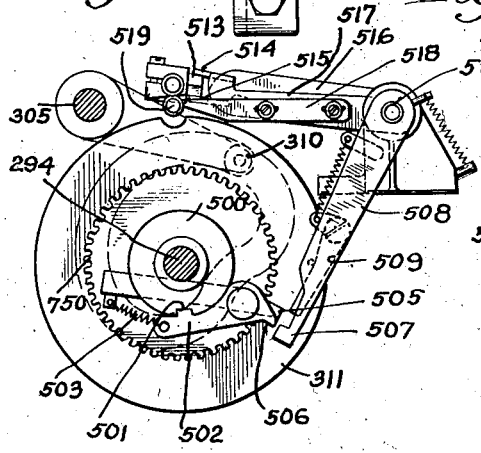
Figs. 6 and 7 are detail views of the clutch mechanism in Fig. 3 in different moved positions.
Figure 7:
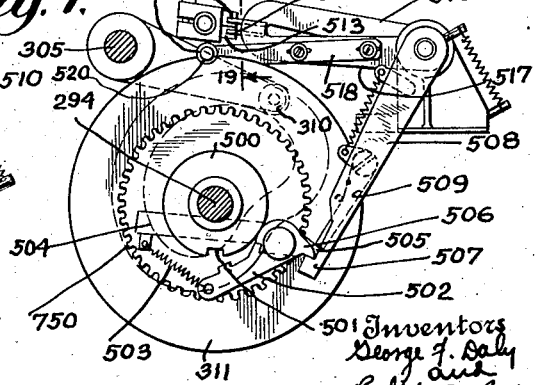

The other cooperating finger 514 is on a supplementary arm 517 (Fig. 23), which is substantially similar in contour to 516. Arm 517, instead of being pinned to shaft 510, is loose thereon, and this arm 517 has secured thereto, preferably adjustably, a supplementary arm 518 (see Fig. 6) carrying upon its end a roller 519 adapted to cooperate with a notch 520 in the listing cam 311. When the list-non-list lever is in listing position the roller 519 is out of engagement with the notch 520, as shown in Fig. 6, but when the shifting lever is in tabulating position this roller 519 is in engagement with the notch, in the manner shown in Fig. 7. The purpose of the roller 519 is merely to positively locate cam 311 which carries dog 502 so that 502 will drop cleanly into slot 501 when shifting lever is shifted to listing position.

We have described the means for raising the type 266 during the listing or individual item printing operations. If, after listing, the printing devices are to be operated to take a total, a cam 301 on the so-called total printing shaft 315 rotates, causing elevation of an arm 302 provided with a cam follower, which arm is loosely mounted on shaft 305 (Fig. 14) and is provided with an abutment 303 which is adapted to contact with an adjustment screw 303ᵃ carried by the bell crank lever 304 thus rocking bell crank 304 in a clockwise direction and similarly rocking shaft 305. As previously described the rocking shaft 305 through arms 306 (Fig. 3) is adapted to raise the type 266. To drive the total printing shaft 315 the customary reset motor RM is provided and this, through a shaft and worm 339, drives a worm wheel 340. Fixed to worm wheel 340 is a ratchet disk 341 (Fig. 4). Fast on shaft 315 is a so-called printing cam 342. Fast to this printing cam is a bar 343 which in turn carries a clutch dog 344. The clutch dog overlies ratchet 341 and is normally disengaged. Engagement of the dog with the ratchet is permitted when the reset clutch magnet 233 is energized. The armature 346 of this magnet is pivoted at 347 and has connected to it an extended arm 348 which is notched to engage the tail of the one revolution clutch dog 344. Upon the energization of magnet 233, latch 348 is elevated and the clutch dog 344 drawn by its spring into engagement with the ratchet 341. Subsequently to this engagement the printing cam and printing shaft 315 rotate in unison with the ratchet making one revolution. During this single revolution of these parts magnet 233 becomes deenergized, permitting latch 348 to reengage the clutch dog and disengage it from the ratchet 341. Part 348 is restored by a spring (not shown) and also by block 349 and pin 350. As in the previous construction a rock arm 354 (Fig. 4) is provided cooperating with the cam 342, which rock arm is fixed to a total print shaft 355. The actuation of this total print shaft derives the amount from the accumulators in the manner described in the previous application. The rocking of the shaft 355 serves also to rock a bail 355ª which opens certain contact devices NL¹, NL², etc., for a purpose which will hereafter be described.

The foregoing has explained the general operation when the tabulator is set for straight listing followed by the taking of a total of the listed items. It will now be assumed that after such a listing run and total is taken it is desired to set the tabulator for straight tabulating, omitting printing of items and printing only totals and group numbers. Figs. 10 and 11 show the report which is printed under these conditions.

The first operation is to shift the tabulator list-non-list lever 316 from the listing position to non-listing or tabulating position. Fig. 13 shows the lever 316 in so-called tabulating position. With this condition of parts the nose 513 (Fig. 19) of the shifter rod 300 will be in the position shown in Fig. 19. Consequently finger pieces 514 and 515 will not be separated. However, upon shifting the lever 316 from the previous listing position to the tabulating or non-listing position the finger pieces 514 and 515 will have moved from the open position shown in Fig. 6 to the closed position shown in Fig. 3 and will have permitted arm 508 to rock from the position shown in Fig. 6 to that shown in Fig. 3 with the end of member 508 on top of the shouldered tail of the clutch dog 502. At this time in the cycle the clutch dog is not disengaged from the notch 501 on disk 500. It therefore follows that upon the first machine cycle the listing cam 311 will make one revolution and at the completion of this revolution the dog 502 will be thrown out, assuming the position illustrated in Fig. 7. This single revolution of the listing cam 311 is utilized for printing the group number on the record sheet as shown in Fig. 10 of the drawings. As shown in Fig. 11 the totals on the record sheet are eventually printed in alignment with the previously printed group number. It is therefore necessary to provide means for preventing the paper feed from the time that the group number is printed until the total printing operation is completed.

After the listing cam 311 has made one revolution the clutch dog 502 is disengaged as above explained and remains disengaged until a total is taken. Upon the taking of a total, magnet 233 is energized actuating armature 346 to lift the cam latch 348 out of the engagement with the cam dog 344 to permit the machine to take a total. The armature 346 and shaft 347 rock together and the rocking of shaft 347 causes an arm 352 to rock clockwise (Fig. 4). Arm 352 engages a pin 621 on an arm 622 fixed on shaft 510 and thus rocks this shaft counterclockwise thereby rocking arm 508 (Fig. 3) counterclockwise releasing dog 502 and allowing it to reengage notch 501 to place the parts in condition for listing the following group.

The control of the paper feeding mechanism, its construction and operation are as follows:

Link 336 at its upper end connects to a ratchet and pawl paper feed device of the usual type, and at its lower end connects to a lever 334 which is pivotally mounted at 601 on a fixed bracket plate 335. Secured to 334 are two L-shaped members 333 and 337 rigidly connected at their right hand ends to 334 at points 601 and 605, their other ends adjustably secured to part 334. Parts 334, 333 and 337 after being once adjusted always operate as a single unit. This unit is actuated either by rocking of shaft 305 or of lever 330. Shaft 305 always operates the paper feeding mechanism when it must feed the paper on the up stroke of the type bars, as for every revolution of cam 311 when listing is being performed, and also for one revolution during the first card cycle when tabulating operations are being performed. As will be shown later, lever 330 actuates lever 334 on the down stroke of the type bars to draw down on link 336 only during the latter part of a total printing and reset cycle when the machine has been previously set for listing.

Figures 8, 9:
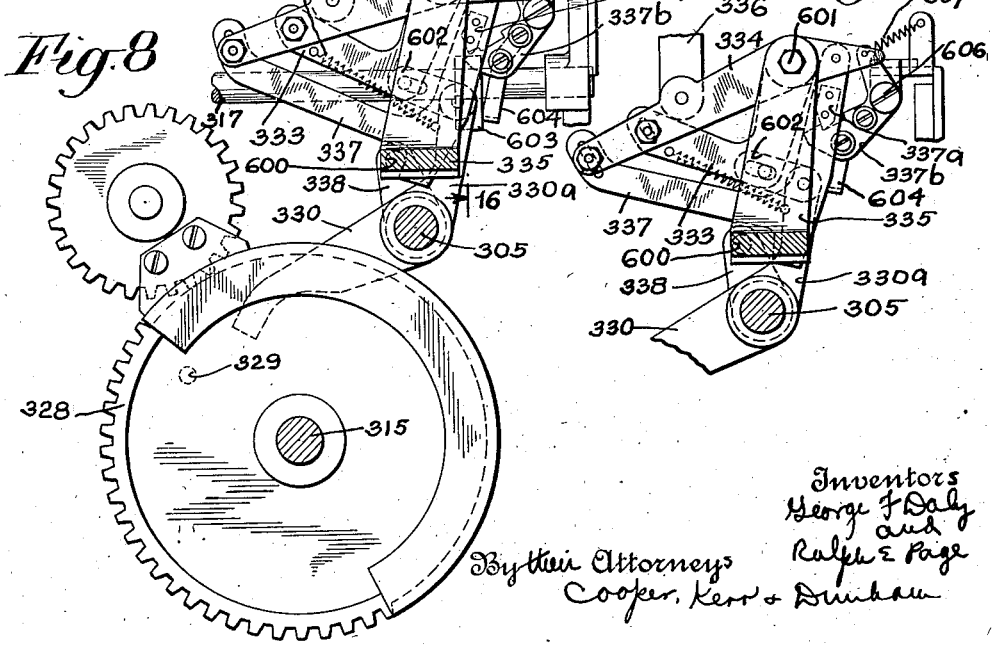
Figs. 8 and 9 are detail views of the parts for controlling the paper feed, Fig. 8 showing certain of the parts in moved position.
Figure 20:
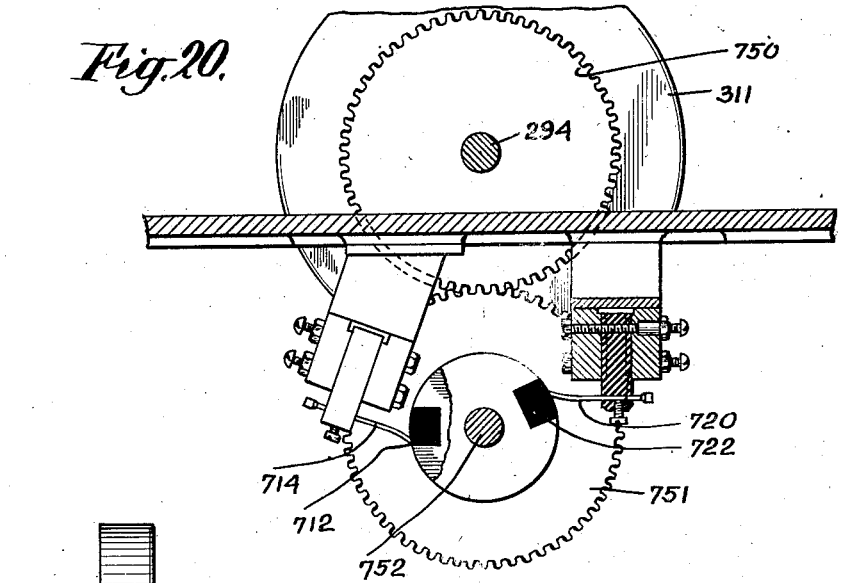
Fig. 20 is an end view of the commutators and the gear drive for the same.

When the machine is set for listing the operation of the paper feeding mechanism is as follows: Lever 316 (Figs. 13 and 16) is shifted manually in a counterclockwise direction to listing position and, as rod 300 is moved to the right, block 603 (Figs. 8 and 16) attached rigidly to shaft 300 makes contact with a projection 604 of latch 337ᵇ which is pivotally mounted at 606, and holds latch 337ᵇ in such position that it cannot engage block 337ᵃ fixed to member 337. Therefore parts 337ᵃ and 337ᵇ are inoperative while the machine is set for listing and are used as will be later explained for tabulating only. While listing, shaft 305 rocks first in a clockwise and then in a counterclockwise direction for each revolution of cam 311 (Figs. 14 and 15). At the end of shaft 305 is an arm 338 having at its upper end a pin 600. As shaft 305 is rocked in a clockwise direction this pin 600 contacts against a shoulder on member 337, rocking the unit comprising parts 334, 333 and 337 about its pivot 601 and drawing down link 336, thus feeding the paper one line space. This occurs while the type bars are being raised. It will be seen that during listing operation the paper is fed one line space for each cycle of operation of the machine or each revolution of cam 311. On the down stroke of the type bars shaft 305 is rocked in a counterclockwise direction and allows lever 334 to resume its former position.

At the end of a group of cards which have been listed a total is taken. When the machine takes a total cam 311 comes to a stop and shaft 315 on which are mounted cam 301 and gear 328 makes a complete counterclockwise revolution, as previously described. Cam 301 rocks shaft 305 (Figs. 14 and 15) through the same arc as described above for cam 311, so that the paper is fed the usual one space before printing a total. Early in the second half of the total printing cycle shaft 305 completes its rocking cycle and link 336 rises to normal position as parts 334, 333 and 337 return to position shown in Fig. 8.

After a total is printed it is desirable to leave a blank space on the paper before listing the first item of the next group. The paper is fed this extra space during the last part of the total printing cycle in the following manner: A pin 329 on gear 328 contacts with lever 330 which is pivoted loosely on shaft 305, rocking 330 in a clockwise direction. Lever 330 has an upwardly extending arm 330ᵃ to which is connected a slotted link 602. As lever 330 is rocked by pin 329 the lost motion in link 602 is taken up, stretching spring 608, and link 602 then acts on a pin fixed in part 333 of the unit consisting of parts 334, 333 and 337. This rocks the unit in a counterclockwise direction thus drawing down link 336 a second time during the total printing and reset cycle to feed the paper an extra space after total printing. The slot in link 602 and the spring 608 above mentioned are necessary to hold lever 330 normally in a counterclockwise position to provide clearance while parts 337ᵃ, 337ᵇ and 604 are operative as will be later described.

If it is desired to perform tabulating (as distinguished from listing) operations on the machine it is necessary to shift lever 316 to tabulating position. As has been pointed out, when the machine is set for tabulating, the listing cam 311 will turn one revolution (during the first card cycle) starting from the position shown in Fig. 3, being stopped by the arm 508 after the completion of one revolution. During this revolution the shaft 305 will be rocked and the paper fed one line space, as above described. But as the shifting of lever 316 to tabulating position has moved block 603 out of contact with projection 604 block 337ᵃ becomes locked in position shown in Fig. 9 by latch 337ᵇ actuated by spring 607. The spacing of the paper takes place during the early part of this cycle. During the same cycle after the spacing has taken place the printing is effected. In the present instance, that is, during tabulating operations, this printing from the first card will be of the group designation number only. As the listing cam 311 is locked against operation at the end of the first card cycle there will be no further printing during the continued operation of the machine until a total is taken. In the meantime as the operation of the paper feed mechanism has been suppressed by the latching of block 337ᵃ by latch 337ᵇ the line on which the group number is printed remains in printing position so that when the total is eventually printed it is on the same line with the group number, as in Fig. 11. When the total is printed shaft 305 is again rocked in a clockwise direction, this time by cam 301, but no movement of 334 or 336 takes place on this up stroke of the type bars due to lever 337 being held by block 337ᵃ and latch 337ᵇ. The result is that paper is not fed at this time and the total is printed on the same line as was the indication number during the first tabulating cycle. Near the end of the revolution of shaft 315, after shaft 305 has returned to its normal position, pin 329 on gear 328 makes contact with lever 330 and causes it to rock about pivot 305 in a clockwise direction, the slot in link 602 attached to its upper end allowing it to move freely. As lever 330 nears the end of its clockwise rocking movement its upward projection 330ᵃ acts against projection 604 of latch 337ᵇ, releasing block 337ᵃ and allowing 337 and attached members, including link 336, to resume normal position, with the shoulder of 337 against pin 600. As soon as pin 329 has passed the end of lever 330, spring 608 draws lever 330 to its normal position. It will be observed from the above that lever 330 has two entirely different functions to perform, depending upon whether the machine is set for tabulating or listing.

Referring now to Figs. 23, 20, 21 and 5, in the present machine a gear 750 is provided upon shaft 294 and fast to listing cam 311.

Figure 21:
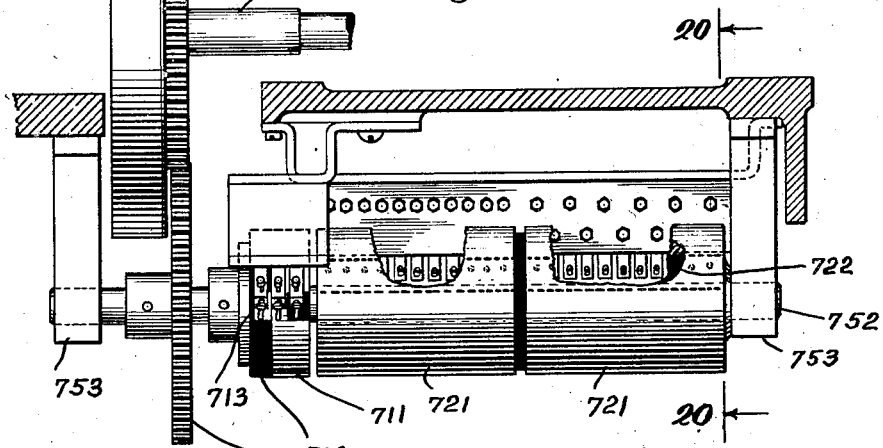
Fig. 21 is a front view of this commutator and associated parts.
Figure 22:
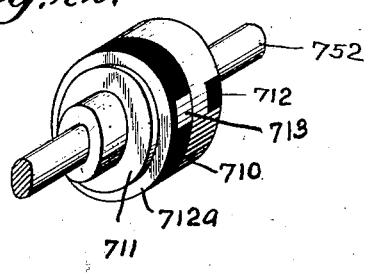
Fig. 22 is a perspective view of the three brush commutator which controls the circuits to the star-circuit-break cams and to the brushes.

This gear meshes with a gear 751 of equal diameter fixed to a shaft 752 journalled in brackets 753. Fixed upon shaft 752 are two commutators 711 and 721. Commutator 721 is of double form, the two sections shown in the circuit diagram sheet being mounted upon the same shaft and insulated from one another as shown in Fig. 21. Cooperating with the commutators 711 and 721 are certain brush devices which will be fully described in connection with the circuit diagram. It is sufficient to state that the commutators 711 and 721 make one revolution at each listing cycle and also that they remain stationary during all tabulating operations when the printing attachment is not in operation. These commutators revolve once for the first card cycle when a group is printed from the first card of a group. The detail construction of these commutators and their function will hereinafter be set forth.

Figure 4:
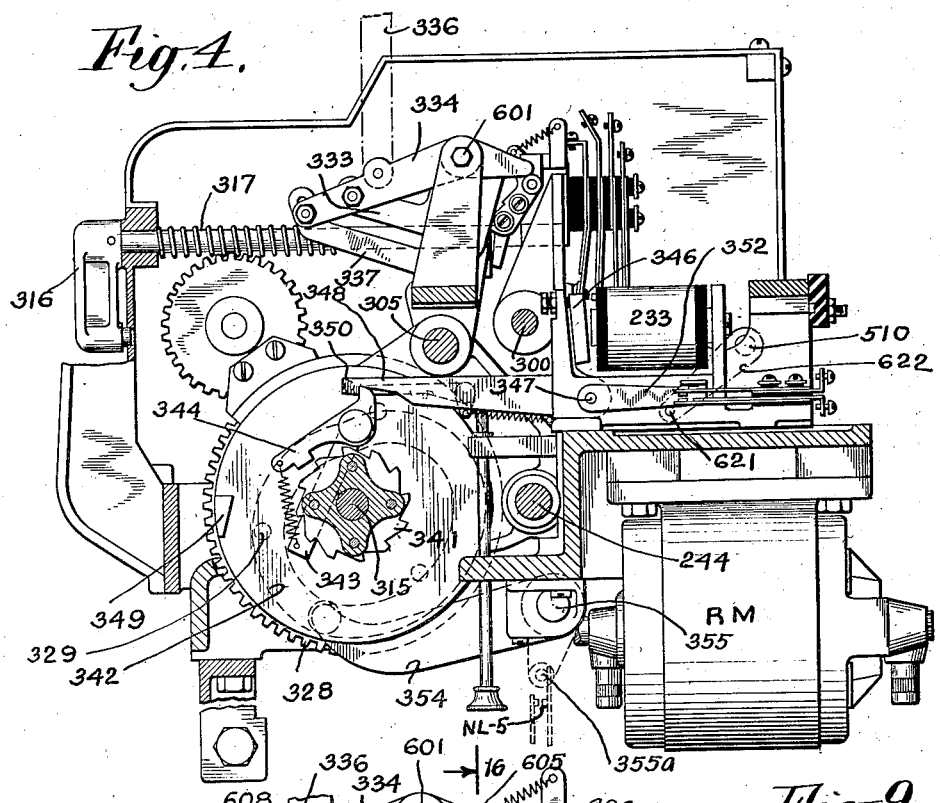
Fig. 4 is a detail sectional view of certain of the parts associated with the reset motor, the section being taken on line 4—4 of Fig. 5.

Referring to Fig. 17, 306 represent the cross head arms for raising the type 266 (see also Figs. 5 and 3). One of these arms is provided with an extension 306$^a$ carrying an insulating block 306$^b$ which cooperates with contacts RS$^1$ to normally hold these contacts open when arms 306 are in the normal inactive lower position. When these arms start to rise upon the beginning of a printing operation part 306$^b$ moves away from contacts RS$^1$ and permits the contacts to close.

Referring now to the diagram views (Figs. 26$^a$ and 26$^b$), 50 designates a stack of record cards which are adapted to be advanced one at a time by means of a picker 51 into engagement with feed rolls 52. The feed rolls ultimately advance the cards to the discharge stack in the usual manner. Rolls 52 are driven by gearing generally designated 53 which in turn is driven by a tabulator motor TM through the usual magnetically controlled clutch 54. This clutch is controlled by clutch magnet 55. Cards are advanced past upper brushes 55$^a$ and contact blocks 56, and thereafter past lower brushes 59 and contact blocks 60. The upper and lower brushes are respectively carried by common bars 57 and 58. Upper and lower card levers 61 and 62 are provided, which card levers are respectively adapted to close upper card lever contacts 63 and lower contacts 64. From the upper and lower brushes cabled wires 65 and 66 are shown leading to plug sockets on the tabulator plugboard 254. Sockets 67 are for the upper brushes and multiple sockets 68 are for the lower brushes. On the plugboard there are also sockets 69 which are connected directly to the counters and supplemental sockets 70 which are directly connected to the printing magnets without having any counter magnets associated therewith. On the upper end of the plugboard there is shown a circuit diagram of the automatic control unit. When certain columns are to be used for automatic controlling, plug connections are inserted between sockets 67 and sockets 670 of the automatic control unit. From socket 680 of the control unit plug connections may be made between 680 and 68. From any plug sockets 68 connection may be made as desired to 69 and 70. It will be understood that the automatic control can be plugged in any desired columns, also that the automatic control may be plugged from 680 to 68 and thence to 70 without plugging up corresponding plug sockets 69. In this way the control number may be printed on the extra listing banks without sacrificing counter capacity when this is done. The automatic control unit is the same as heretofore employed in machines and requires no detailed description. Briefly one of the magnets 72 is plugged in series between the upper and lower brushes of each column selected for automatic control and the contacts 73 of the selected magnets are connected in series with each other in the control circuit 74. When the control perforations in the cards under the upper and lower brushes agree the selected magnets will be energized momentarily and their contacts 73 closed. The contacts when once closed will remain closed until the end of the machine cycle and then open. As long as the control perforations in the cards under the upper and lower brushes agree, then, the control circuit will be established and remain established when the cam contacts C$^1$ open towards the end of the cycle. If the card perforations do not agree, however, at least one of the selected control magnets will not be energized during the cycle and the failure of its contacts 73 to close will prevent establishment of the control circuit 74 during that cycle, whereupon the opening of the cam contacts C$^1$ will deenergize motor control magnet 84 and cause the machine to stop at the end of the cycle. This mechanism is well known in the art and requires no further description.

As in previous machines, prior to the starting up on any tabulator operation a resetting cycle is carried out.

Current to the tabulator is supplied from a suitable source 81 which, when closed, supplies current to the left side of the line, 82, and right side of the line, 83. The tabulating motor TM in the present machine differs from motors heretofore used in that it is provided with a special compound winding. It is provided with a series field 700 and a shunt field 701. Also in circuit with the series field in the armature circuit there is a small resistance 702. This resistance may or may not be within the motor proper, preferably it is within the motor in the armature winding thereof. In practice it has been found that ten ohms is a satisfactory value for this resistance when the motor operates on one hundred and ten volts. Passing through the tabulator motor from the left side of line the armature circuit extends through resistance 702 to binder post 16. The shunt field winding connects to binder post $F^1$. Binder post $F^1$ and 16 are connected by a high resistance 703 which as determined by practice should be of a value of about twelve hundred ohms. Binder posts $F^1$ and 16 are further connected to binder posts 8 and 10 and intermediate these binder posts there are pairs of contacts $Y^1$ and $RS^1$. From binder post $F^1$ a wire leads to the relay point of relay 704. This relay is in a circuit leading from binder post 16 to clutch magnet 55 and cam contacts $C^4$.

As previously explained, when the machine is running for tabulating (non-listing), it runs at low speed for the first card of the group because the group number is being printed. On following cards when the machine is tabulating only, it runs at high speed. The resistance 702 is provided to prevent the drop of current after the motor has picked up, which drop might be sufficient in extent to cause deenergization of clutch magnet 55 or the motor relay 85.

Assuming that the list-non-list lever 316 is shifted to tabulating position and contacts $Y^1$ are thereby opened and it is desired to print the group number of the first card and to then print totals only, the tabulator is started in operation by depressing the start key 80. With the tabulator stationary both contacts $RS^1$ and contact $Y^1$ are open. On starting there will be a quick initial flow of current through the series field 700, resistance 702, relay 704, through clutch magnet 55 and over to the other side of line through contact 86 which has been closed by the previous reset cycle. Relay 704 is an extremely rapid acting relay and picks up its armature quickly so as to establish a shunt around resistance 703. The tabulator motor TM now starts in operation at comparatively low speed and with a high starting torque due to the fact that the shunt field resistance 703 is shunted out of circuit thereby rendering available full shunt field strength for starting purposes.

Almost instantly after the motor has started in operation the rocker shaft contacts $RS^1$ close, these contacts being closed by the raising of the type bar cross head 306. The closure of contacts $RS^1$ also provides a shunt around resistance 703. So long as this resistance 703 is shunted out of circuit the shunt field will be of maximum strength and will cooperate with the series field to bring about the normal low speed operation of the tabulating motor. It may be explained that relay 704 is so proportioned that it only comes into operation with the high initial current flow under starting conditions. Immediately after this high current has passed through the relay the current flow therein will diminish to such extent that the armature of the relay will drop back thereby opening up the circuit from binding post $F^1$. The relay 704 will not be again energized until another starting operation. At the end of the first card cycle during which the group number is printed in tabulating operations contacts $RS^1$ will again reopen due to the return of the cross head. Just as soon as these contacts $RS^1$ open and with relay 704 open resistance 703 will again be placed in the shunt field circuit. When this resistance is in circuit with the shunt field the shunt field will be proportionally weakened thereby permitting higher speed operation of the tabulating motor. This effect is due to the well known fact that weakening of the shunt field in a compound wound motor will allow the motor to run faster. The tabulating motor continues in operation at this higher speed for the rest of the cards of the group. Upon the stopping of the motor and the commencement of a new tabulating operation on a new group the same speed cycle operations are repeated.

When the list-non-list lever 316 is shifted to listing position, in which every card means a printing operation, contacts $Y^1$ are closed at all times and these contacts being directly across the resistance 703 they act to permanently shunt resistance 703 out of circuit so that the tabulating motor operates at low speed for all card cycles while listing is being effected.

In the foregoing it has been assumed that the circuit from clutch magnet 55 went to the right side of the line. This circuit will now be traced. Upon closure of start key 80 current will flow through the path previously traced, through 55, motor relay 85, start key 80 now closed, contacts 86 now closed, emergency stop key 87 now closed, to binder post 9, thence through upper cam contacts $P^3$, now closed, to binder post 12 on the other side of line. The above operation has started up the tabulator motor TM, energized the clutch magnet 55, engaged the one revolution clutch 54 thereby starting cards feeding through the machine. After the initiation of the cycle by the start key, motor relay 85 attracts its armature and establishes a stick circuit to keep the motor in operation. From the relay point 85 a line extends to upper card lever contacts 63 and another line extends to cam contacts $T^1$. From $T^1$ a line also extends to cam contact $L^6$. After the machine has operated to a certain extent $T^1$ closes establishing a circuit to binder post 9. As soon as the upper card lever contacts 63 have closed another holding circuit is established from these contacts to terminal 90, thence to contacts 86, stop key 87, to binder post 9. The card lever contacts 63 maintains the operation of the tabulator provided relay 84 which controls contacts 86 remains energized. If either 86, 63 or 87 are opened the tabulator will be stopped at the end of the cycle when cam contacts $T^1$ open, the operation being continued until that time.

In addition to the upper card lever circuit just described there is a circuit to the lower card lever contacts 64. These contacts 64 are connected to card lever contacts 63 and also to binder post 11. When contacts 64 close a controlling circuit is also established from binder post 9 through cam contacts $T^1$ to the point of relay 85, thence back through 64, binder post 11 and through a line 705 to certain brush controlling contact devices which will hereafter be described.

The tabulator is now in operation and the cards successively pass the upper and lower brushes. So long as these cards agree in their controlled perforations control circuit 74 is made at each card cycle. This circuit maintains the tabulator in operation so long as a card group continues. On a resetting operation such as one performed before starting the tabulator or one after a change of card group lower cam contacts $P^3$ make, establishing a circuit 707 to control relays 91 and 84 thereby energizing these relays. After control relay 91 is energized a stick circuit is established through the relay armature, cam contacts $C^1$ and back to binder post 12. Cam contacts $C^1$ break once per card cycle, but during the time that these contacts break there is a second holding circuit through the relay of armature 91 and through control circuit 74 and back to binder post 12. This circuit is maintained until card groups change. Following the breaking of circuits 74 the tabulator motor is maintained in operation until cam contacts $C^1$ open whereupon control relays 91 and 84 are deenergized and the tabulator is stopped as previously described.

As previously explained cam contacts $T^1$ normally function to bring the tabulator to a stop at the D (home) position. There is a slight coasting or momentum of the tabulator to bring the tabulator to this position and when the tabulator motor is operated at the slower listing speed it has been found that the contacts $T^1$ do not open at a late enough time to bring the machine to home position. For this purpose cam contacts $L^6$ are provided, which contacts operate only when listing. These contacts are in series with contacts $Y^2$ which are closed by the list-non-list lever when the machine is set for listing. Cam contacts $L^6$ are timed to operate slightly later in cycle than cam contacts $T^1$ therefore bringing the machine to the D position when it is running at slow speed.

The upper cam contacts $P^3$ serve the purpose of contacts previously employed in machines of this type to break the tabulator circuit during resetting operations thereby preventing the restarting of the tabulator until resetting is completed. Switch 241 when closed provides for automatic restarting after each reset operation, this circuit being completed by cam contacts $P^4$ at the end of the reset cycle. Switch 708 is the automatic control switch which is always open when the machine is running under automatic control and closed when the automatic control is to be cut out of operation and straight tabulating non-controlled operations are to be performed. Switch 232 when closed assumes automatic resetting and total printing at the end of a tabulating operation upon the closure of cam contacts $L^1$. 234 is a clutch magnet contact which is only closed when a tabulating operation has been completed. Cam contacts $P^1$ complete the operation of the reset motor RM and also shunt out reset clutch magnet 233 after the start of the cycle. Contacts 235 are closed by the reset clutch magnet 233 and maintain the reset motor circuit until cam contacts $P^1$ make as in previous machines. 243 is the manual reset key. Cam contacts $L^2$ are contacts which prevent resetting except when the tabulating machine is at the D position.

As previously explained circuit 705 from binder post 11 always is energized when cards are passing through the machine. This circuit 705 extends to a brush 709 which bears upon a contact segment 710 of a commutator 711, which commutator is provided with an alternate arrangement of insulating and conducting segments such as 712, $712^a$ and 713. Cooperating with these segments are brushes 714 and 715, respectively. As previously explained the commutator is driven during printing operations only, making one revolution for each card cycle when listing and one revolution during the group indicating of the first card when tabulating. At other times during straight tabulating operations this commutator is stationary. From brush 709 a wire 716 leads to so-called star wheel contacts $T^4$ and $T^5$. From brush 715 a line 717 leads to one side of cam contacts $T^2$ and $T^3$. The function of commutator 711 is to establish a circuit from 709 through 713, 715, 717 to $T^2$, $T^3$, during tabulating only after the first card cycle. During such operations commutator 711 is stationary with brush 715 in contact with conducting segment 713 which is common with conducting segment 710. Under these conditions brush 714 is on insulating segment 712 and therefore the circuit 718 leading away from this brush is opened. With commutator 711 rotating, cam contacts $T^2$, $T^3$, will be cut out of circuit at all times except when at the D position. Thus during listing operations current can only flow from the left side of contacts $T^2$, $T^3$, through the star wheel contacts $T^4$, $T^5$. Star wheel contacts $T^4$ and $T^5$ make and break once for each index point perforation on the card and their timing is such that they break the circuit before the brush leaves a hole in the card thereby preventing arcing at the brushes. From left side of cam contacts $T^2$ and $T^3$, also $T^4$ and $T^5$, a circuit 719 leads to the common bar 58 of the lower brushes. The star cams $T^4$ and $T^5$ are on shaft $260^a$.

The present machine in addition to having five counters with five corresponding printing banks is provided with two extra printing banks marked 1 and 2 (Fig. $26^b$). The printing magnets of these printing banks are marked $102^a$ and through the usual controlling resistance connect directly to plug sockets 70. In place of using individual circuit breakers in the printing circuits for these additional banks as heretofore, in the present construction each printing magnet $102^a$ is connected to a brush 720, which brush cooperates with the commutator 721. This commutator is provided with an insulating segment 722. The drive of this commutator is such that during tabulating operations after the first card cycle the commutator will be stationary, the brushes 720 bearing on insulating segment 722. During listing operations the commutator will make one revolution, and the brushes will bear on the conducting portion 723 of the commutator at all times except when the tabulating machine is at the D part of the cycle. Thus during other parts of the cycle all of the brushes will establish contact with the conducting portion 723 which in turn through a common brush 724 connects through line 725 to left side of line 82. The purpose of commutator 721 is to prevent back circuits through the printing magnets $102^a$ when these additional listing banks are used in connection with the automatic control device to print group numbers. With the present construction there are no such objectionable back circuits and control numbers can be printed by the additional listing banks 1 and 2.

When the commutator is employed in connection with the listing banks it is necessary that some means be provided for taking the arc from the brushes. This is accomplished during listing operations by means of the star cams $T^4$ and $T^5$.

As previously explained commutator 711 turns only during the operation of the printing attachment. Thus there is a complete rotation of commutator 711 for the first card cycle when the machine is set for tabulating and a separate complete rotation for each card cycle when the machine is set for listing. This commutator therefore may be employed for controlling the circuits to the printing magnets for printing the first group number. Let it be assumed that brush 714 is in contact with the contacting portion 710 of the commutator thus current can flow from 709 through 710, through brush 714 to wire 718. From wire 718 for the first card cycle current flows through upper cam contacts $P^2$, now closed, to certain circuits which will now be described. In Fig. $26^b$ 102 are the printer magnets of the counter banks. These printer magnets are connected to common bars 103. Bars 103 through wires 104 connect to the non-list contacts NL—1, NL—2, 3, etc. Contacts NL—1, 2, and 3 are open at all times except when a total is printed. Therefore with these contacts open it would be impossible to print the group numbers on the printing devices corresponding to these particular counters. If, however, it is desired to print the group number on the field of the record corresponding to, say, bank No. 3, a switch 634 is provided which would be first closed around the non-list contact $NL^1$. With this switch closed during the first card cycle and with the commutator circuit 709, 710 and 714 closed during the same card cycle current would be supplied to the common bars 103 through wire 718, upper contacts $P^2$ now closed, line 635, contacts $LP^1$ now closed, through switch 634 to common bar 103. In this way the magnets 102 are provided with a return path for the current which, as will be understood, is a secondary circuit which has been completed by the energization of counter magnets from the brushes and the subsequent closing of contacts 100 coming directly from the brushes through the plugged up counter circuits. This counter magnet circuit will be traced for one column: from left side of line, wire 82, wire 101, contacts 99, counter magnet 98 to plug socket 69, thence by plug connection to plug socket 68, thence through wire 65 to lower card contact blocks 60. On the passage of an index point perforation current passes from these blocks through lower brushes 59 and wire 719 to the left side of cam contacts $T^2$, $T^3$. On a listing operation or upon a group number being printed from the first card of a group current will flow through $T^4$, $T^5$, through 716, wire 705, binder post 11 and through the circuit previously traced to the right side of line at binder post 12.

If a tabulating operation is being performed on a card other than the first card of a group the current instead of passing through $T^4$ and $T^5$ will pass through $T^2$ and $T^3$, wire 717, brush 715, segment 713, through 710, 709, wire 705 and back to right side of line as before. The energization of magnet 98 closes contacts 100 and sets up a supplementary circuit as follows: from left side of line 82, through 101, contacts 100, printer magnet 102, common bar 103, wire 104, non-list switch 634 and back through the circuit previously traced through wire 635, upper cam contacts $P^2$, wire 718, through the commutator and back to right side of line through binder post 11. If the tabulator is set for listing all the switches 634 will be closed on those banks on which it is desired to list individual items. The same applies if extra Nos. 1 and 2 banks are to be used for printing group numbers. If it is desired to only print totals on particular banks corresponding switches 634 can be opened.

Contacts $LP^1$, $LP^2$, $LP^3$, etc., are driven and actuated by and from total printing shaft 315 (Fig. 5). The purpose of these contacts is to break the circuit to the printing magnets at the end of the printing part of the reset cycle. Upper contacts $P^2$ whose cam is on the printing shaft 315 are used to prevent objectionable back circuits during the total print part of the cycle. The upper contacts open at the beginning of a total print cycle and close at the end of such cycle. The lower path of cam contacts $P^2$ close at the beginning of the total print cycle and open at the end of the cycle. During total printing, current to the printing magnets 102 is supplied from right side of line 83 through non-total print switch 237, which switch has been previously closed. If it is desired to suppress the printing of totals this switch 237 is opened.

If a particular bank of the machine correlated to a counter is used for printing group numbers it will be understood that the group numbers will be accumulated in that counter. Obviously it is not usually desirable to print such group number accumulations. Therefore if group numbers have been indicated on a particular counter bank and after the tabulating on the particular group has been completed it is necessary that the accumulated group number be not printed. This is effected by opening up zero button contacts 128 by zero button lever 129. With the zero button shifted the counter will not be cleared nor will the group number accumulation be printed. Before this particular counter can subsequently be used for useful accumulating purposes it is necessary to clear out the accumulation of group numbers from the counter. This is done by a resetting operation and prior to such resetting switch 237 is opened to prevent the accumulation of group numbers from being printed upon the record sheet.

With the present machine it is possible to use the additional listing banks 1 and 2 for printing control numbers or group designating numbers when the tabulator is being run under non-list conditions at high speed. Furthermore, such control numbers or group designating numbers can be printed when the entire capacity of all of the counters is being used for accumulating purposes. This can be accomplished inasmuch as the printing type on the extra listing bank rise and go through one cycle for each card group at the beginning thereof.

Actual printing operations are controlled by stepped cams 111 and contacts 112 as is well known in the art.

Supplementary asterisk circuits 238 controlled by contacts 239 permit the energization of magnets $102^b$ whenever totals are printed.

The general operation of the machine is as follows: A plurality of groups of record cards are placed in the card magazine in position to be picked by the picker 51 and advanced into cooperative relationship with the card feed rolls 52. Assuming that automatic operation is desired, switches 232 and 241 will be closed and auto control switch 708 will be opened. Now if it is desired to simply tabulate certain items on the cards without listing them but to print the group designating number from the first card and print a total of the items of each group, the list-non-list lever will be moved to nonlisting position thereby opening the contacts $Y^1$ and $Y^2$.

The upper and lower card lever contacts 63 and 64 are now open and the motor control relay contacts 86 are open; in other words it is assumed that the tabulator control circuits are absolutely dead and all preliminary operations necessary to place them in operating condition must be performed. The switch 81 is first closed to energize the main lines 82 and 83. Under the present conditions the tabulator cannot be started by the start key 80 as the starting circuits controlled by this key are open at the contacts 86 and $T^1$. The contacts 86 must be closed to permit starting of the tabulator motor TM and the upper and lower card lever contacts 63 and 64 must be closed to insure continuous operation and proper control of the tabulator after it has started. The operation is initiated by depressing the reset key to close the contacts 243, whereupon the reset motor RM is energized through a circuit extending from line 82 through the motor and reset clutch magnet 233 to contacts 234, controlled by the card feed clutch magnet and normally closed thence through reset key contacts 243 and cam contacts $L^2$, closed as long as the listing cam is in D position, to binding post 12 in main line 83. The reset motor then turns and the energization of clutch magnet 233 permits the one revolution clutch to engage for a single revolution. The closure of the reset key contacts 243 need only be instantaneous as the energization of clutch magnet 233 closes contacts 235 which are in parallel with the reset key contacts. During this reset cycle the cam contacts $P^1$ close, short circuiting and deenergizing clutch magnet 233 which releases its armature and causes disengagement of the reset clutch at the end of a single revolution. The reset motor RM will also stop in its home position after a single revolution, its circuit being broken at the proper time by the opening of the cam contacts $P^1$. The operation of the reset motor closes and then opens lower cam contacts $P^3$ the closure of which energizes the motor control relay magnet 84 through a circuit extending from line 82 through magnet 84 and stick magnet 91 to lower contacts P³ and thence to binding post 12 in line 83. The opening of the lower contacts P³ will not deenergize magnet 84 as the energization of magnet 91 has closed a supplementary circuit for it including two parallel branches, one comprising the cam contacts C¹ and the other the automatic control circuit 74 extending through the automatic control contacts 73. As explained above the cam contacts C¹ open once each tabulating or listing cycle and serve to deenergize the motor control relay 84 unless the record cards under the upper and lower brushes correspond in their group designating perforations. If these designations agree, however, the circuit of the relay 84 will be maintained through the automatic control contacts 73 at the time when the cam contacts C¹ are open. This initial reset cycle has served to clear the accumulators of any data which might have been standing therein from any previous operations and has established the circuit of the motor control relay 84 causing closure of contacts 86. The operation will not cause automatic starting of tabulating, however, as the initial card is still in the magazine and the circuit controlled by the automatic start switch 241 is open at the lower card lever contacts 64.

The cards must now be fed beneath the brushes. The tabulating motor TM is energized by closing the start key contacts 80 whereupon the motor circuit traced above extending through the start key contact 80 and the motor control relay contact 84 is established. The tabulating motor makes only a single revolution, however, as there is no card under the lower brushes as yet and the automatic control circuit is not established. So when the contacts C¹ open, the motor control relay 84 will be deenergized opening contacts 86 and causing the cam contacts T¹ to stop the tabulating motor in its home or D position after a single revolution. The first card has now been fed beneath the upper brushes.

It will be noted that owing to the preceding reset cycle this first cycle by the tabulating motor will be a low speed cycle and ordinarily would be a listing cycle. There is no possibility of printing however as the lower brushes are not energized owing to the fact that the lower card lever contacts which control the energization of the lower brushes are open.

The machine must now be driven through another reset cycle in order to again close the motor control relay contacts 86 and prepare the listing cam clutch for another low speed listing cycle at the beginning of tabulating proper. This second reset cycle will operate just as the prior one to close contacts 86 and at the end of it the machine will again stop in D position as tabulating cannot be initiated automatically owing to the fact that the lower card lever contacts are still open.

Automatic operation may now be initiated by closing start key contacts 80 whereupon the tabulator motor again starts to operate, being energized through the various start circuits previously traced and its control being eventually assumed by the motor relay contacts 86, the upper card lever contacts 63 and the cam contacts C³ and T¹. The first cycle of this group will feed the card previously under the upper brushes to the lower ones closing card lever contacts 64 and initiating automatic tabulating operation. From the prior description it will be understood that during the first tabulating cycle the tabulating motor will operate at low speed owing to the closure of the contacts RS¹ by the type bail during the first part of the cycle. Towards the end of the cycle the contacts RS¹ open, throwing resistance 703 in circuit with the shunt field of the motor and causing it to operate at high speed for the remaining cards of the group.

The group indicating numbers are printed during the first slow cycle of tabulating operation. It will be recalled that the listing cam turns during this cycle serving to raise the type bars and causing the commutators 711 and 721 to rotate. It may be assumed, by way of example, that listing bank 1, which has no counter wheels is properly plugged from its sockets 70 to the proper lower brush sockets 68 so that the printing of the group indicating numbers will be controlled by the printer magnets 102ᵃ of this bank. The rotation of the commutators 721 connects the printer magnets to the line 82 in all positions except the D or home position and the rotation of the commutator 711 causes the brush 715 to ride on the insulating portion of the commutator breaking the brush energizing circuit through the contacts T², T³. The brushes are then energized by a single pulse for each index point position through a circuit extending from the brush 709 through the star contacts T⁴, T⁵, these contacts being so timed that any circuit established through the brushes will be broken at the contacts before the corresponding analyzing brush clears the card perforation. An analyzing brush encountering a perforation, then, will close a circuit through the corresponding printer magnet 102ᵃ as follows: from line 82, through wire 725, brush 724, conducting portion 723 of the commutator 721 and from brush 720 to printer magnet 102ᵃ, thence through properly plugged sockets 70 and 68 and cabled connections 65 to contact blocks 60 and through a record perforation to analyzing brush 59 and block 58, thence through wire 719 to star contacts T⁴, T⁵ and through wires 716 and 705 to binding post 11, thence through card lever contacts 64 and 63 to contacts 86 and through stop key contacts 87, binding post 9 and upper contacts P³ to binding 12 in line 83. The printing control current in this connection passes directly through the analyzing brushes.

It is quite possible with the present machine to control the group indicating number printing from one of the accumulating banks such as 3, 4 or 5, the total printing circuit for the selected bank in this case being manually broken by push button 129 and contacts 128 and the listing circuit being closed at switch 634. The analyzing brushes on encountering a perforation will complete the circuit previously traced through the corresponding counter magnet 98 which causes entry of the number into the counter element and immediately breaks its own circuit at contacts 99 and closes the printer magnet circuit at contacts 100. The printer magnet circuit for this case extending across brush 714, commutator section 710 and brush 709 has been previously traced.

Either of these printing circuits will be incapacitated during the subsequent tabulating cycles as after the initial cycle the commutators 711 and 721 remain at rest in the position shown in the drawing in which brushes 724 and 720 rest on the insulating portion 722 of commutator 721 and brush 714 rests on the insulating portion 712 of commutator 711.

Tabulating will continue after the initial cycle without further printing until the end of the group when the control circuit 74 will be opened, de-energizing motor relay magnet 84 and permitting contacts 86 to open, whereupon the tabulating motor circuit will be interrupted by contacts T¹ to stop the tabulating motor in its D or home position. This interruption of the tabulating motor circuit de-energizes the card feed clutch magnet 55, permitting contacts 234 to close whereupon a reset motor circuit will be established by the contacts L¹ toward the end of the last tabulating cycle, this circuit extending through upper cam contacts P³. Early in the cycle the upper contacts P³ open but by this time contacts P¹ have closed maintaining the reset motor in operation for one complete cycle during which total printing is effected. This resetting cycle will again close the circuit of the motor relay magnet 84 through the lower contacts P², and, as cards are now under the brushes and card lever contacts 63 and 64 closed, the operation of the tabulating motor will be automatically resumed, owing to the closure of the cam contacts P⁴ towards the ends of the resetting cycle. The initiating circuit in this case extends through motor TM, relay coil 704, clutch magnet 55, relay coil 85 and switch 241 to cam contacts P⁴, thence to binding post 11 and lower card lever contacts 64 upper card lever contacts 63, motor relay contacts 86, stop key 87 to binding post 9 and across upper contacts P³ which have again been closed, back to line 83.

If it is desired to delay the total printing after tabulating the cards of a group the switch 232 may be opened in which case the reset motor RM will not operate automatically but only when the reset key 243 is depressed. On the other hand if it is desired to cut out the automatic group control the switch 708 is closed to shunt the automatic control circuit in which case the motor control relay 84 will remain energized holding the motor control relay contacts 86 closed so that the tabulating motor will continue in operation as long as record cards are passing beneath the brushes. Furthermore if switch 241 is opened tabulating will not be resumed automatically after reset but only on closure of start key 80.

If it is desired to list each accumulated item the list-non-list lever will be thrown to listing position, closing the contacts Y¹ and Y² and causing the tabulating motor whenever it is brought into operation to operate at slow speed. In this case the listing cam will operate during each cycle to raise the type bars and the commutators 711 and 721 will rotate during each cycle to prepare the selected printing control circuits as explained above. The operation of the machine otherwise is as has just been explained.

What we claim is—

1. A tabulating device, a printing device, means for operating said devices conjointly, or operating the tabulating device alone, in combination with a 2-speed driving motor therefor, a resistance for controlling the speed and torque characteristics of said motor, a plurality of contact devices for controlling the coaction of said resistance and said motor, and means governed by the printing device for automatically changing the speed of said motor.

2. A card-controlled printing tabulator for tabulating data gathered from groups of cards, a 2-speed driving motor therefor, a resistance for controlling the speed of said motor, in combination with means for automatically cutting out said resistance adjacent the beginning of the first card cycle of a group and cutting in said resistance at the end of said first card cycle.

3. In combination, a tabulating machine, a variable speed driving motor therefor, a plurality of automatic stopping devices for said motor, said stopping devices being timed to act at differential times according to the speed of the motor.

4. In a tabulating machine having a driving motor therefor and in which the motor and said tabulator have a plurality of operating speeds, means for automatically interrupting the motor circuit at one time in the tabulating cycle when the tabulator and motor are operating at one speed, and means for automatically interrupting the motor circuit at a different time in the tabulating cycle when tabulator and motor are operating at a different speed.

5. A tabulator device, a printer device, means for operating the same conjointly or for operating the tabulator device alone, in combination with a two speed driving motor therefor, and means controlled by and upon the operation of the printing device for automatically providing the driving motor with low speed high torque characteristics whereby a slow and powerful drive is secured for the tabulator and printer when operated conjointly.

6. In a combined printing and tabulating device in which means is provided for operating said devices conjointly or for operating the tabulating device alone, in combination, a driving motor, means for automatically supplying high-torque starting characteristics for said motor, means operable automatically under the control of the printing attachment for automatically slowing down the motor speed, and means for automatically effecting an increase of the motor speed by and upon the termination of the first printing cycle.

7. The invention set forth in claim 6 in which means is provided for suppressing the action of said speed controlling means controlled by the printer device when said tabulator is operated alone whenever the tabulator is operated independently of said printer device.

8. A tabulating machine including in combination with a plurality of controlling magnet circuits, a common return circuit therefor, and means for preventing back circuits from one magnet circuit to another, comprising a commutator including a contact portion connected to said common return circuit, and an insulated portion, brushes connected to said magnet circuits and bearing upon said commutator, said brushes resting simultaneously upon the insulated portion or upon the conducting portion according to whether back circuits are to be prevented or a common return circuit established.

9. A printing tabulator having supplemental printing banks provided with printer magnets and printing circuits independent of any individual contact or switching devices therein, a circuit maker and breaker timed to make a circuit at each index point position and immediately subsequently break said circuit, and means for automatically bringing said circuit breaker into cooperation to control the said printer magnets when, and only when, the printing mechanism is in operation.

10. The invention set forth in claim 9 in which a commutator is provided for cutting said circuit breaker into circuit for the purpose described.

11. A tabulating machine having a printing device with printing magnets and circuits therefor, and means comprising a commutator device including brush means and a rotatable member having insulated and conducting portions for establishing a supply of current to said printing magnet circuits by and upon the operation of the printing device.

12. A tabulating machine having in combination therewith a printing device having printer magnet circuits, means for effecting a supply of current to said circuits when the printing device is in operation, said means comprising a commutator having brush means cooperating therewith, and means for driving said commutator in unison with said printing device.

13. A tabulating machine having a printing device adapted to be brought into operation upon the first card cycle of a group for printing group numbers and to thereafter remain inactive during tabulating operations upon the following cards of the group printer control devices, and means brought into action by and upon the operation of said printing device for permitting the operation of said printer control devices during the first card cycle and for subsequently suppressing the action thereof during the card cycles when the printing device is inactive.

14. In a tabulating machine in combination with a driving motor having a series field and a shunt field, means for variably controlling the strength of said shunt field, said means comprising a relay device arranged to come into operation by and upon an initial surge of starting current to bring about full shunt field strength for starting purposes, and means operable after the tabulating device has been started in motion for automatically suppressing the action of said relay.

15. In a tabulating machine in combination with a driving motor having a series field and a shunt field, means for variably controlling the strength of said shunt field, said means comprising contact devices brought into operation by the initial movement of parts of the machine for automatically maintaining full shunt field strength for the first card cycle and for thereafter automatically weakening said field strength for the card cycles in which the subsequent cards of a group are tabulated.

16. In a machine of the class described in combination with tabulating devices and printing devices, said devices being operable conjointly or said tabulator being operable independently, and means controlled by the operation of the printing devices for automatically bringing about an increase of speed of the tabulator after a card cycle is completed in which printing was effected by said printing devices.

17. In a printing tabulating machine in which printing devices and tabulating devices are capable of conjoint operation and in which the tabulating device is capable of independent operation, means for driving said devices, and means controlled by said printing device for automatically maintaining a slower driving speed when said printing device is in operation.

18. In a printing tabulating machine in which printing devices and tabulating devices are capable of conjoint operation and in which the tabulating device is capable of independent operation, and means controlled by said printing device and operable at the end of a cycle of operation thereof for bringing about a faster driving speed than the speed which was effective during printing operation.

19. A tabulating machine having a multiple speed driving motor, said motor having low-speed high-torque characteristics and relatively higher-speed lower-torque characteristics, and means for automatically changing the said motor from one torque and speed characteristic to another in accordance with which one of a plurality of functions is being performed by said tabulator.

20. In combination, a tabulating device, a printing device, a two speed driving electric motor having low speed, high torque characteristics suitable for driving said printing device and higher speed lower torque characteristics suitable for driving said tabulating device, means for selectively connecting said tabulating device alone to said motor or said tabulating device and said printing device to said motor for conjoint operation and means controlled by said selective means for selecting the electrical characteristics of the motor appropriate to the selected machine operation.

21. A printing tabulator comprising a plurality of printing devices and a plurality of accumulating devices, each including electrically operated means for controlling a printing device, operating mechanism for said printing devices to print items entered into the accumulating devices and a commutator driven by said operating mechanism for controlling said electrically operated means.

22. A printing tabulator comprising record analyzing means, a plurality of printing devices and electrically operated control devices therefor controlled directly by said analyzing means, operating mechanism for said printing devices controlled by said control devices to print items represented on the controlling records and a commutator driven by said operating mechanism to incapacitate said control devices in the absence of a printing operation.

23. A printing tabulator comprising record analyzing means, a plurality of printing devices, a plurality of accumulating devices adapted to be controlled by said analyzing means each including electrically operated control devices for said printing devices, electrical operated printing control means adapted to be controlled directly by said analyzing means, operating mechanism for said printing devices to print items represented on controlling records under control of said control devices, means for selectively connecting said accumulating devices or said second named printing control means to said analyzing means and a commutator driven by said operating mechanism to incapacitate both of said control devices in the absence of a printing operation.

24. In combination, a tabulating device, a printing device, a two speed driving motor having high speed characteristics suitable for driving said tabulating device and low speed characteristics suitable for driving said printing device, means for selectively connecting said tabulating device alone to said motor or said tabulating device and said printing device to said motor for conjoint operation, means controlled by said selective means for selecting the appropriate motor speed for the selected machine operation and means controlled by said selective means for automatically cutting off power from said motor at differential times according to its speed.

25. In combination, a tabulating device, a printing device, a two speed driving motor having high speed characteristics suitable for driving said tabulating device and low speed characteristics suitable for driving said printing device, means for selectively connecting said tabulating device alone to said motor or said tabulating device and said printing device to said motor for conjoint operation, means controlled by said selecting means for selecting the appropriate motor speed for the selected machine operation and means operated by the tabulating device according to its different operating speeds for automatically cutting off power from said motor at differential times according to its speed.

26. In combination, a tabulating device, a printing device, a motor having a series field and a shunt field for driving said devices, selective means for connecting said tabulating device alone to said motor or said tabulating device and said printing device to said motor for conjoint operation, a resistance in series with the shunt field of said motor and contact devices controlled by said selective means for shunting said resistance to effect low speed and high torque driving characteristics for said motor when it drives the printing device in conjunction with the tabulating device.

27. In combination, a tabulating device, a printing device, a two speed motor having high speed characteristics suitable for driving said tabulating device and low speed characteristics suitable for driving said printing device, selective means for connecting said tabulating device alone to said motor or said tabulating device and said printing device to said motor for conjoint operation, an armature circuit for said motor and an additional circuit including speed control devices for controlling the speed of the same and means controlled by the selective means for controlling the speed control devices to select the motor speed suitable for the different machine operations, whereby the speed of the motor may be controlled independently of its armature.

28. In combination, a tabulating device having electrical controlling elements, a printing device, a two speed motor having high speed characteristics suitable for driving said tabulating device and low speed characteristics suitable for driving said printing device, selective means for connecting said tabulating device alone to said motor or said tabulating device and said printing device to said motor for conjoint operation, a circuit including the armature of said motor and said electrical controlling elements and additional circuit including motor speed control devices controlled by said selective means to select the motor speed suitable for the different machine operations.

29. In combination, a tabulating device having electrical controlling elements, a printing device, a two speed motor having high speed characteristics suitable for driving said tabulating device and low speed characteristics suitable for driving said printing device, selective means for connecting said tabulating device alone to said motor or said tabulating device and said printing device to said motor for conjoint operation, a circuit including the armature of said motor and said electrical controlling elements and a field circuit for said motor in parallel with the armature including a series resistance and contact devices controlled by the selective means to switch said resistance into and out of circuit to select the motor speed suitable to the different machine operations.

In testimony whereof we hereto affix our signatures.

GEORGE F. DALY.
RALPH E. PAGE.